United States Patent Office 3,323,512
Patented June 6, 1967

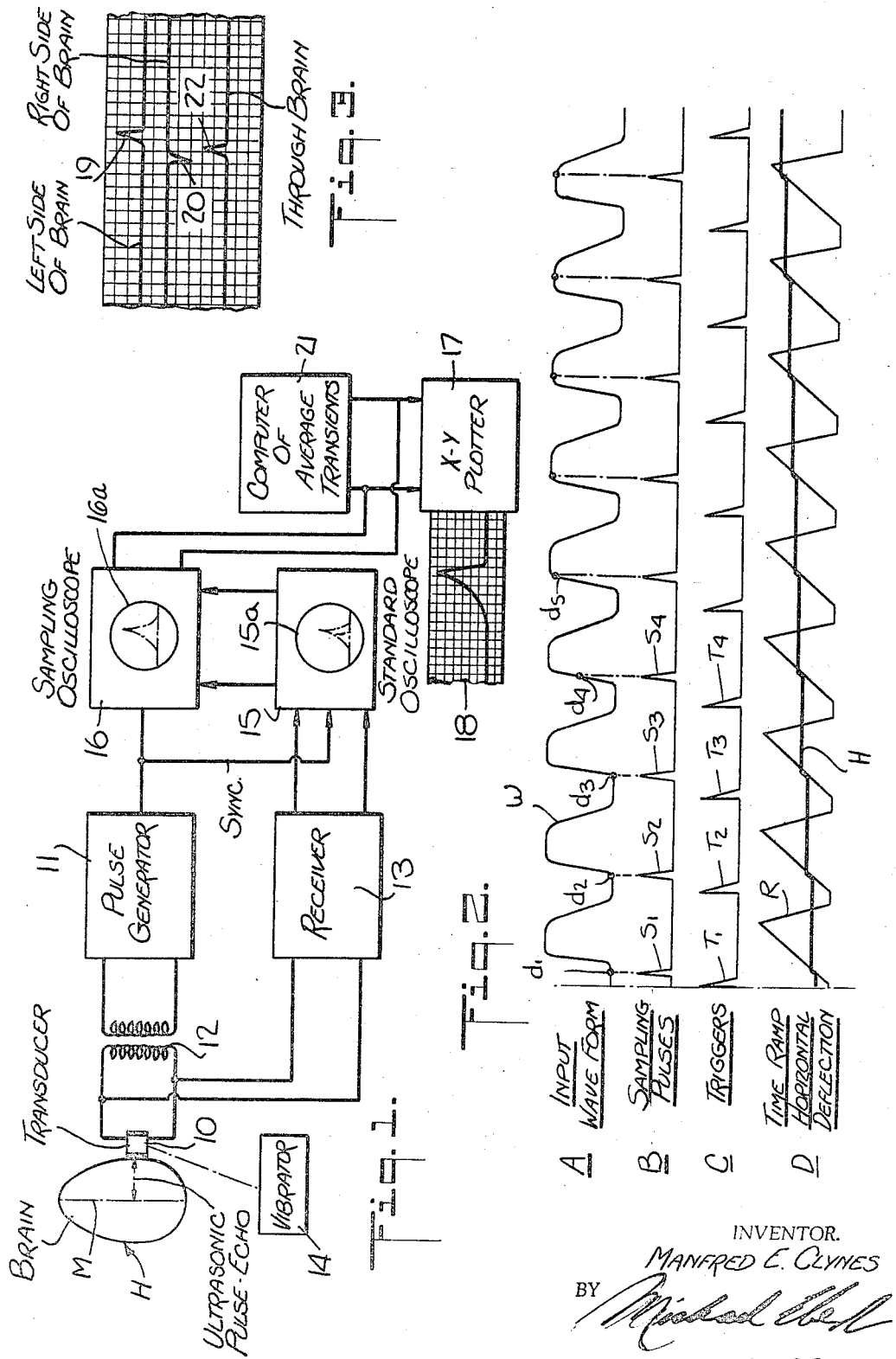

3,323,512
ULTRASONIC DIAGNOSTIC INSTRUMENT HAVING IMPROVED RESOLUTION AND SENSITIVITY
Manfred E. Clynes, Palisades, N.Y., assignor to Air-Shields, Inc., Hatboro, Pa., a corporation of Delaware
Filed Aug. 3, 1964, Ser. No. 386,946
9 Claims. (Cl. 128—2)

ABSTRACT OF THE DISCLOSURE

Display and recording techniques for high frequency ultrasonic echoes. Discloses the use of a cathode-ray oscilloscope, mechanical recording equipment and an averaging computer for storage and display purposes. The reflected high frequency ultrasonic wave is sampled at points which are shifted progressively in time. This is accomplished by the following. A trigger circuit produces timed trigger pulses which initiate saw tooth ramps. Each time a ramp voltage equals the voltage of the horizontal deflection circuit of the cathode-ray tube a sampling pulse is initiated. Simultaneously, the voltage of the horizontal deflection circuit is raised to a new level so that the initiation of the next sampling pulse is delayed by a predetermined amount. The instantaneous amplitude of the reflected ultrasonic wave is measured each time a sampling pulse is generated. A composite wave form having a far greater duration than a single wave form is constructed from the samples. Another feature is the mounting of the transducer so that it rocks back and forth during a scanning cycle.

My invention relates generally to ultrasonic exploratory techniques, and more particularly to a pulse-echo ultrasonic instrument wherein echo pulses occurring at a relatively high repetition rate are sampled to produce a reconstructed echo waveform which may be recorded at a relatively slow speed.

In recent years, ultrasonic techniques have been employed to explore and measure the internal structure of living organisms. Since this technique is non-destructive, it is free of the hazards incident to the use of X-rays or gamma rays. In the ultrasonic technique, a beam of ultrasonic pulses is projected in the direction to be viewed, measurement being based on the amount of time it takes for an echo pulse to return from a reflecting object or target within the internal structure. For this purpose, a transducer is placed on the skin of the subject and coupled thereto with a cream or fluid.

In the so-called "A" type of cathode-ray indicator frequently used in conjunction with ultrasonic instruments, echo pulses from different reflecting targets within the structure being examined are displayed as "pips" of varying height along a time base line on an oscilloscope screen. The height of each pip is indicative of the relative reflectivity of the target, whereas the displacement of the pip with respect to the point of origin of the base line is proportional to the distance between the external transducer and the internal target.

If, for example, the instrument is used for brain diagnosis, measurements may be taken to determine the position of the brain's midline from either side of the head to detect a condition of asymmetry therein. It is known that displacement of the brain's midline of more than a certain amount is of pathological significance, for asymmetry can signal a treatable disorder such as hematoma. Distortion of the midline may also occur by reason of a tumor producing pressure on the cranium.

There are three major drawbacks in existing ultrasonic instruments when used for brain diagnosis or for other examination purposes. Inasmuch as the amplitude of the echo derived from the reflecting target varies with the orientation of the beam-producing transducer, in order to obtain a clear picture on the cathode-ray indicator, it is necessary that the transducer be placed exactly at the position providing the strongest echo and that this position be held steady.

A small deviation in transducer placement brings about a marked deviation in the amplitude of the echo, and while the time displacement between the transmitted pulse and echo pulse does not change materially, unless the transducer position is just right, an adequate echo will not be available for measuring purposes. To avoid such problems, it is sometimes the practice to use a beam of relatively large cross-section to intercept the target, but such beams reduce the resolution of the system.

The second drawback has to do with recording the echo pattern. Even if the transducer position is held steady, in order to make a permanent record of a given oscilloscope reading, the only feasible method for this purpose is photographic reproduction, which is costly, time-consuming and requires development and printing.

The third drawback arises from the fact that to obtain a favorable signal-to-noise ratio, comparatively large ultrasonic intensities must be used, otherwise the echoes are buried in noise. But in diagnostic work on human patients such large ultrasonic intensities may be medically hazardous.

Accordingly, it is the main object of this invention to provide an ultrasonic instrument in which the transducer position is rendered non-critical even when a very sharp beam is used, and wherein precise indications and recordings are nevertheless obtainable.

Also an object of the invention is to provide a "space averaging" ultrasonic instrument in which the transducer is rocked about its desired position and wherein the resultant recurrent echo pulses of varying amplitude from a given target are sampled to recreate the echo pulse in a time scale which facilitates slow-speed recording and precise measurement.

Also an object of the invention is to provide an ultrasonic diagnostic instrument including a sampling circuit, whose output may be applied to a cardiographic recording device or other slow-speed moving chart recording apparatus already available in clinical facilities, to provide a permanent and accurate recording of the ultrasonic readings, thereby effecting a significant economy in instrument costs.

Yet another object of the invention is to provide an ultrasonic instrument in which the transducer is slightly rocked back and forth about its desired position and wherein the resultant recurrent echo pulses of varying amplitude from a given target are sampled to recreate the echo pulse in a time scale within the speed limit of a computer of average transients, whose sweep is synchronized with the sampling circuit, whereby a series of slow-speed sampled echo pulses may be averaged.

One significant advantage of this arrangement is that it makes possible the use of higher ultrasonic frequencies at lower intensities to obtain a clear measurement. The higher the frequency, the greater the resolution of the system in depth. Moreover, with high frequencies there is less beam dispersion when using smaller transducers, hence lateral resolution is improved. However, because greater absorption is encountered at high frequencies, this dictates the need for higher intensities which may be medically harmful. But since the present invention makes possible the use of lower intensities it at the same time permits the use of higher frequencies within the region of safety, with the concomitant advantages.

Briefly stated, these objects are attained in an ultrasonic instrument wherein a beam of periodic ultrasonic pulses is projected by means of a transducer to produce recurrent echo pulses which are introduced into a sampling oscilloscope. A sampling voltage is derived from each echo, the sampling voltage having an analog value determined by the instantaneous amplitude of the pulse at the instant of sampling.

The sampling points are shifted progressively from echo to echo, whereby the resultant series of sample voltages for a given train of echoes constitute a single reconstructed echo waveform whose duration is far greater than the duration of a single echo. Hence, by applying the vertical and horizontal voltages from the sampling device to an X–Y recorder and synchronizing the movement of the chart with the time base while the stylus is deflected in accordance with the series of sample values, a permanent record may be developed of the ultrasonic reading.

By rocking the transducer back and forth and thereby rendering its position non-critical, despite amplitude variations in the resultant sample echo a clear reading may be obtained by averaging the sample echoes in a computer of average transients.

For a better understanding of the invention as well as other objects and further features thereof, reference is made to the following detailed description to be read in conjunction with the accompanying drawing, wherein:

FIG. 1 is a schematic diagram of an ultrasonic instrument incorporating a sampling oscilloscope in accordance with the invention;

FIGS. 2A, 2B, 2C and 2D illustrate the echo pulses applied to the sampling oscilloscope section of the instrument as well as the control pulses applied thereto; and FIG. 3 shows a chart recording on which two reconstructed waveforms obtained from the sampling device are recorded one below the other on the same time base to provide a comparative reading.

While the invention will be illustrated in conjunction with brain measurement, it will be appreciated that the same operating principles may be used for many other examination purposes. Referring now to FIG. 1, the instrument is adapted to measure the distance between the temple of the head H and the midline membrane M of the brain. By taking readings from opposite temples of the head, the existence of midline symmetry or asymmetry may be quickly determined. As pointed out previously, such information is of diagnostic value, for asymmetry is symptomatic of brain pathology.

The instrument in accordance with the invention includes a pulse-echo section having an ultrasonic transducer 10 which may take the form of barium titanate. This material behaves as an electrostrictive piezoelectric transducer adapted to convert radio-frequency energy into ultrasonic waves, or to convert ultrasonic waves into radio-frequency energy. Thus the transducer is capable of acting as an ultrasonic transmitting or detecting element. The transducer is coupled directly or by a fluid medium to the head of the patient.

The transducer 10 is excited by means of a pulse generator 11 operating at a carrier frequency in the range for example, of 1 to 10 megacycles, to produce an exploratory beam. The generator is coupled to the transducer through a coupling transformer 12. Echo pulses detected by the transducer are applied directly to a receiver 13 tuned to the pulse frequency of the associated transducer to produce output voltage pulses whose magnitudes are in proportion to the amplitude of the echo pulses.

The pulse generator operates at a repetition rate of, say, about 500 to 1000 pulses per second, each pulse being of microsecond duration, whereby a relatively long interval for echo pulse reception exists between successive pulses. In practice, the duration of each pulse may be in the order of five microseconds or even shorter, and should be made up of as few cycles of the resonant frequency as possible.

In actual practice, a unit is used having a pulse repetition rate of 1000 pulses per second, with a pulse duration of about two microseconds at two megacycles, the beam diameter being 1 cm. As pointed out previously, the present invention makes it possible to use small beam diameters to obtain good resolution, without however making the transducer position critical. Thus it is possible to go to higher frequencies and small beam diameters where normally attenuation is so great as to call for very high intensities. Where for head examination, 2 megacycles represented the safe upper frequency limit it is now possible to go as high as ten megacycles, with a five-fold increase in resolution in depth and also laterally if a narrow beam is used.

Assuming that the transducer 10 is beamed or focused along a path towards a particular region of internal structure, the presence of reflecting targets such as the membrane M intercepted by the beam, results in echo pulses which will be picked up by the same transducer, the echo pulses returning at different points in time depending on their relative distance from the transducer, as in the case of sonar systems.

However, instead of maintaining the transducer steady at a position producing echo pulses of the target amplitude, the transducer 10 may be rocked slightly back and forth a few degrees (i.e., no more than 3 degrees) or vibrated by means of a vibrator 14 so that while the echoes still have their same time of arrival, their amplitude is modulated as the beam shifts from an optimum position providing maximum amplitude, to a position resulting in a lesser amplitude.

Thus the time of arrival of the echo pulse gives an indication of the spatial position of the echo-producing target. The amplitude of the echo pulses and hence the oscilloscope pips will depend on the characteristics of the reflecting structure with respect to the pulse frequency. For example, a bone will ordinarily produce a higher degree of reflectivity than an artery. Similar differences will occur for other internal elements of the human body, depending in a sense on their acoustic properties, very much as objects in an auditorium have different absorption or reflection qualities with respect to sound tones.

The output of the receiver 13 is applied to the intensity-modulation electrode in the electron gun of a cathode-ray oscilloscope 15. The electron beam from the gun is electromagnetically or electrostatically deflected in the horizontal and vertical planes.

To display the various echo pulses in the path of the beam along a base line, a time base saw-tooth wave generator in the oscilloscope 15 is coupled to the deflection means to deflect the beam along a horizontal line. The time base generator is synchronized with pulse generator 11 so that the scanning sweep commences simultaneously with the transmission of the ultrasonic pulse.

As the electron beam is swept horizontally it is vertically deflected by the output of the receiver. Thus, as shown on the screen 15a of the cathode-ray oscilloscope 15, along the base line is an echo response whose position thereon depends on the position of the reflecting target. The pulse-echo section of the instrument, apart from the use of the vibrator to rock the transducer, may be constituted by standard equipment of the type which is currently available.

Since the pulses are transmitted at a relatively high rate and the echoes are received in the interval between pulses at the same rate, it is not ordinarily possible to record the echo pulses on moving chart recorders or other relatively slow mechanical recording devices. In accordance with the invention, such recording is made feasible by the use of a sampling oscilloscope 16 also coupled to the output of receiver 13 and synchronized by the pulses derived from generator 11.

The sampling oscilloscope 16, which may be of the type manufactured commercially by the Hewlett Packard Company (H–P 185B, 1000 MC Oscilloscope), uses a stroboscopic technique to reconstruct the input waveform from samples taken during many recurrences of the waveform. In this way, bandwidth limitations of conventional cathode-ray tubes and amplifiers are obviated. The recurrent echo waveforms, which emerge from receiver 13, are illustrated in simplified form by the waveforms W in FIG. 2A.

In reconstructing a waveform, a sampling pulse effectively renders the sampling circuit operative for an extremely brief interval (i.e., less than 1.2 nsec.), and the instantaneous amplitude of the waveform voltage at that instant, as shown in FIG. 2 by the dots $d_1$, $d_2$, $d_3$, etc., is measured. The beam spot on the cathode-ray tube is positioned vertically to a level corresponding to the voltage amplitude of the dots, the series of dots on the screen produced in the course of a full sampling sweep thereby plotting the reconstructed waveform.

In operation, from cycle to cycle of the input waveform each sample is picked off at a slightly later point in the input waveform with respect to the previous sample. The cathode-ray spot is shifted horizontally a short distance and is positioned vertically to the new sample voltage. In this way, the scope plots the reconsructed waveform point by point. In practice, as many as one thousand samples per trace are used to reconstruct the waveform, although as little as seventy samples per trace may be used to produce an acceptable reconstruction. Thus the pulse-echo section is operated for a brief interval to generate a train of echoes sufficient to provide a predetermined number of samples to obtain a reconstructed echo waveform.

A bright trace is obtained without regard to the sampling rate, the sweep speed or waveform duty cycle, for each cathode-ray spot, remains "on" during the full interval between samples. The manner in which progressive delay of the sampling pulses is obtained, is illustrated in FIGS. 2B, 2C and 2D. Periodic trigger pulses $T_1$, $T_2$, $T_3$, etc., initiate the "real time" ramp R, as shown in FIG. 2D. It will be noted that the duration of each sawtooth ramp corresponds to the duration of each cycle of waveform W.

When the ramp voltage attains the voltage level being held by the horizontal deflection circuits, a comparator circuit generates a pulse which initiates the sampling pulse. The horizontal deflection of sweep voltage, as indicated by the step voltage H, then rises to a higher level. The sampling pulses $S_1$, $S_2$, $S_3$, etc., as indicated in FIG. 2B, are generated periodically at intervals corresponding to the points in time at which the horizontal deflection voltage steps to a higher level, these points being progressively shifted in time relative to the trigger pulses $T_1$, $T_2$, etc. which are synchronized by the pulse generator 11. The sampling density is determined by the voltage change between steps of the horizontal deflection voltage. This sampling density remains constant, therefore, despite any change in sweep speed.

We shall assume for purposes of illustration that the instrument is adjusted to provide 1000 sampling points during each trace of the beam as effected by the horizontal deflection voltage, this voltage then returning to its initial value in preparation for the next trace. The horizontal deflection voltage therefore is effectively a recurrent sawtooth wave, there being one sawtooth wave for each 1000 recurrences of the input waveform. The reconstructed waveform appearing on screen 16a is made up of the 1000 sampling voltages and has a duration corresponding to the duration of the horizontal deflection voltage.

The output of the sampling oscilloscope, which is constituted by a series of analog voltages developed along a time base, may be applied to any conventional X-Y plotter 17, or moving chart recorder, to provide a permanent record of the reconstructed echo. For this purpose, the chart motor is synchronized with the time base of the sampling device, whereas the stylus writing thereon is actuated by the sample voltages whereby a trace corresponding to the reconstructed waveform is described on the chart 18, as shown in FIG. 1.

Among the moving chart recorders which may be used, are those associated with electrocardiographic instruments intended to record heart pulsatory voltages. Since such instruments are widely available at medical facilities, it is not necessary to supply a recorder with the ultrasonic instrument, but merely to feed the output of the sampling oscilloscope to the recording section of the cardiographic device.

An important advantage of moving chart recorders, in the context of ultrasonic diagnositic measurement, is that in brain midline measurements, for example, the echo obtained on one side of the head may be recorded, as shown in FIG. 3, as pattern 19, and the echo obtained on the other side may be recorded on a parallel base line as pattern 20, thereby providing a direct comparison whereby any distortion of the midline is immediately indicated. The third pattern 22 is obtained by passing the beam through the entire head, rather than obtaining an echo from the midline. According to prior art techniques, this may be accomplished with separate transducer and receiver crystals placed on opposite sides of the head or with a single transducer-receiver. In the latter case all echoes are gated out except those reflected from the opposite side of the head. A suitable gating technique for this purpose is disclosed in Carlin Patent 3,256,733. In this way pattern 22 provides a reference indication equal to the sum of the two sides of the head.

For the same purpose, moving chart recorders of the type used in seismographic or weather instruments may be used, wherein the chart is placed on a rotary drum. This drum movement may readily be synchronized with the time base of the sampling oscilloscope. Since after each scan, the drum is returned to its initial position, the next scan can be made parallel to the first as shown in FIG. 3.

As pointed out previously, to render the transducer position non-critical, the transducer is rocked to provide echoes whose time position is substantially unchanged but whose amplitude varies as the beam deviates from its optimum position in the course of the rocking motion. An average waveform may then be obtained by averaging techniques. However, while averaging computers are known, such computers are not fast enough to average echoes whose recurrence rate is as high as that in a pulse-echo ultrasonic instrument. But by use of sampling techniques as disclosed herein, averaging is made possible.

In the computer of average transients of the type which is disclosed in my Patent 3,087,487, the analog signal to be analyzed is first applied to a pulse modulator which generates pulses having a repetition rate varying as a function of the amplitude of the signal. The resultant train of pulses is fed into an arithmetic register which is controlled by an electronic clock mechanism.

The arithmetic register of one commercial form of the instrument known as "CAT" is provided with 400 memory locations, each capable of storing up to 100,000 counts, the clock controlling the amount of time the register will accept counts from the modulator and store them in one of the memory addresses. This digitizing process is repeated for a predetermined number of signal responses so that each memory location accumulates the pulse counts derived from a particular interval in time relative to the onset of the input signal. Thus, as the sums build up in the register, the signal components, which add coherently, emerge from the background activity which appears in a random manner.

The amount of time spent at each address is variable and can be selected by the operator. The dwell time of the CAT at each memory address can be as little as 78.125 microseconds. This means that a response of 31.25 milliseconds can be digitized and stored in 400 addresses (approximately 80 microseconds per channel).

The speed limitations described above in connection with the computer are those characteristic of one commercially available form of computer of average transients. It will be appreciated, however, that limitations of a similar order will necessarily be encountered in any form of computer of average transients wherein an input analog voltage is converted along a series of sampling points into a series of corresponding digital values which are stored sequentially in a series of memory locations, whereby with repetitive scanning actions the signal components add coherently, whereas noise adds randomly. Such averaging computers all serve to enhance signal-to-noise ratio, but they are all more or less limited in their speed of analysis.

When the signal to be analyzed is of extremely brief duration, say a pulse transient of one microsecond width, computers of average transients are incapable of carrying out the desired analysis. Assuming that a minimum of ten points of a particular sample wave shape are needed to define that wave shape, when a pulse of one microsecond width is to be analyzed, the computer must be capable of addressing at a rate of 0.1 microseconds per channel. But the above-described computer, as noted previously, is limted to a maximum speed of 80 microseconds per channel, and hence cannot analyze at the desired speed.

However, if the region of the echoes is sampled by sampling oscilloscope 16 and the analog output of the sampler repeatedly fed to a computer of average transients 21, swept synchronously with the sampling oscilloscope, then as transducer 10 is rocked, an average waveform will appear. Since the echo appears normally about 1000 times a second, the sampler can take mean values as the transducer is rocked to and fro at a slower rate of, say, 2 per second to 60 per second, thereby "space averaging" the echo response.

In order to obtain a so-called "B" type presentation, where the transducer position is shifted after a scan is made at a particular position, the output of the sampling device, instead of being fed to the Y input of the recorder, is applied to its pen pick-up control so that the pen is depressed and makes a mark only at a position determined by the pulse echo. The Y input is put under the control of the transducer positioning device, whereby for each new transducer position, the Y input is actuated accordingly. In this way a "B" trace is developed.

While there has been shown and described a preferred embodiment of an ultrasonic instrument in accordance with the invention, it will be appreciated that many changes and modifications may be made therein without, however, departing from the essential spirit of the invention as defined in the annexed claims.

What I claim is:
1. An ultrasonic diagnostic instrument comprising
(A) an ultrasonic pulse-echo section including means to transmit an exploratory beam of periodic ultrasonic pulses and means to receive ultrasonic echoes in the interval between transmitted pulses to produce a diagnostic image, and
(B) a sampling section coupled to the pulse-echo section and including means to introduce the echoes therein cyclically for a given umber of occurrences and to derive during each cycle thereof a sample voltage whose value is determined by the instantaneous amplitude of the input waveform at the instant of sampling, the said sampling section including means for progressively shifting the sampling points in time from cycle to cycle whereby the resultant series of sample voltages constitutes a single reconstructed waveform.
2. An ultrasonic diagnostic instrument comprising
(A) an ultrasonic pulse-echo section including means to transmit an exploratory beam of periodic ultrasonic pulses and means to receive ultrasonic echoes in the interval between transmitted pulses to produce a diagnostic image,
(B) a sampling section coupled to the pulse-echo section and including means to introduce the echoes therein cyclically for a given number of occurrences and to derive during each cycle thereof a sample voltage whose value is determined by the instantaneous amplitude of the echo at the instant of sampling, the said sampling section including means for progressively shifting the sampling points along a time base from cycle to cycle whereby the resultant series of sample voltages constitutes a single reconstructed echo waveform, and
(C) a recording section coupled to said sampling section and responsive to said series of sample voltages to produce at relatively slow speed a record of said reconstructed waveform.
3. An instrument as set forth in claim 2, wherein said recording section is constituted by a moving chart recorder having a chart whose movement is synchronized with said time base of said sampling oscilloscope.
4. An instrument as set forth in claim 2, wherein said recorder is of the drum type.
5. An instrument as set forth in claim 4 wherein said pulses are derived from an ultrasonic generator whose frequency exceeds 2 megacycles.
6. An ultrasonic diagnostic instrument comprising
(A) an ultrasonic pulse-echo section including means including a transducer to transmit an exploratory beam of periodic ultrasonic pulses and means to receive ultrasonic echoes in the interval between transmitted pulses to produce a diagnostic image,
(B) a sampling section coupled to the pulse-echo section and including means to introduce the echoes therein cyclically for a given number of occurrences and to derive during each cycle thereof a sample voltage whose value is determined by the instantaneous amplitude of the waveform at the instant of sampling, the said sampling section including means for progressively shifting the sampling points in time from cycle to cycle whereby the resultant series of sample voltages constitutes a single reconstructed waveform,
(C) a computer of average transients section operatively coupled to said sampling section and adapted to digitize and store the reconstructed waveform, the reconstructed waveform being repeatedly generated for a given number of times to effect averaging thereof, and
(D) means to coordinate the action of both sections to synchronize the sampling action in said sampling section with the digitizing and storage action in said computer section.
7. An ultrasonic instrument as set forth in claim 6, including means to rock said transducer to and fro.
8. An instrument as set forth in claim 7, wherein said rocking is within 3 degrees.
9. An instrument as set forth in claim 7, wherein said transducer is rocked back and forth by a vibrator at a rate of about 2 to 60 vibrations per second.

References Cited
UNITED STATES PATENTS

| | | | |
|---|---|---|---|
| 3,086,390 | 4/1963 | Brown | 128—2 |
| 3,087,487 | 4/1963 | Clynes | 128—2.1 |
| 3,256,733 | 6/1966 | Carlin | 73—67.8 |

OTHER REFERENCES
Pell, "Ultrasound" in Ultrasonics for April–June 1964, p. 87.

RICHARD A. GAUDET, *Primary Examiner.*

SIMON BRODER, *Examiner.*